(12) United States Patent
Hippen et al.

(10) Patent No.: US 9,729,035 B2
(45) Date of Patent: Aug. 8, 2017

(54) ELECTRIC MOTOR ROTOR

(71) Applicant: EcoMotors, Inc., Allen Park, MI (US)

(72) Inventors: Will Robert Nielsen Hippen, Eureka, CA (US); Franz J. Laimboeck, Golet, CA (US); Peter P. Hofbauer, West Bloomfield, MI (US); Tyler R. Garrard, Buelton, CA (US)

(73) Assignee: EcoMotors, Inc., Allen Park, MI (US)

( * ) Notice: Subject to any disclaimer, the term of this patent is extended or adjusted under 35 U.S.C. 154(b) by 23 days.

(21) Appl. No.: 14/686,446

(22) Filed: Apr. 14, 2015

(65) Prior Publication Data
US 2015/0222164 A1 Aug. 6, 2015

Related U.S. Application Data

(63) Continuation of application No. 13/153,642, filed on Jun. 6, 2011, now abandoned, which is a
(Continued)

(51) Int. Cl.
*H02K 17/16* (2006.01)
*H02K 3/48* (2006.01)

(52) U.S. Cl.
CPC ............. *H02K 17/165* (2013.01); *H02K 3/48* (2013.01); *Y10T 29/49012* (2015.01)

(58) Field of Classification Search
CPC ... H02K 17/165; H02K 3/48; Y10T 29/49012
(Continued)

(56) References Cited

U.S. PATENT DOCUMENTS

| 102,007 | A | 4/1870 | Hull |
| 876,930 | A | 1/1908 | Bergman |

(Continued)

FOREIGN PATENT DOCUMENTS

| CN | 1217764 A | 5/1999 |
| JP | 2001238418 A | 8/2001 |

(Continued)

OTHER PUBLICATIONS

Oct. 20, 2015 First Office Action and Search Report of counterpart Chinese Patent Application No. 201210184241.7, issued by the State Intellectual Property Office of P.R. China, and attached English Translation thereof.
(Continued)

*Primary Examiner* — Alex W Mok
(74) *Attorney, Agent, or Firm* — Barnes & Thornburg LLP

(57) ABSTRACT

A rotor of an electric machine is disclosed that resists expansion of the rotor components even at high rotational speed. The rotor includes first and second pluralities of laminations having slots to accept rotor bars. A support disk, also having slots, is placed between the laminations. The support disk, into which the rotor bars are slid, restrains the rotor bars from bending outwardly at high rotational speeds of the rotor. The rotor bars are further restrained at the ends by end rings, which have apertures into which ends of the rotor bars are placed. In some embodiments, containment rings are placed over axial extension of the end rings to prevent outward bowing at high speeds. In some embodiments, the rotor includes a stiffener sleeve to provide additional resistance to expansion during high rotational speeds.

20 Claims, 6 Drawing Sheets

Related U.S. Application Data continuation-in-part of application No. 12/791,832, filed on Jun. 1, 2010, now Pat. No. 8,344,576.

(60) Provisional application No. 61/217,674, filed on Jun. 3, 2009.

(58) Field of Classification Search
USPC .......................................... 310/216.004, 211
See application file for complete search history.

(56) References Cited

U.S. PATENT DOCUMENTS

| | | | |
|---|---|---|---|
| 2,949,555 | A | 12/1957 | Paul |
| 3,078,381 | A | 2/1963 | Volkrodt |
| 3,401,280 | A | 9/1968 | Lackey et al. |
| 3,612,925 | A | 10/1971 | Swanke |
| 3,614,496 | A | 10/1971 | Schiethart |
| 3,694,906 | A | 10/1972 | Rank et al. |
| 3,732,448 | A | 5/1973 | Schiethart |
| 4,341,966 | A | 7/1982 | Pangburn |
| 4,559,463 | A | 12/1985 | Kobayashi |
| 4,568,846 | A | 2/1986 | Kapadia |
| 4,617,726 | A | 10/1986 | Denk |
| 4,769,993 | A | 9/1988 | Kawamura |
| 5,040,286 | A | 8/1991 | Stark |
| 5,300,845 | A | 4/1994 | Fanning et al. |
| 5,605,045 | A | 2/1997 | Halimi et al. |
| 5,898,990 | A | 5/1999 | Henry |
| 5,906,098 | A | 5/1999 | Woollenweber et al. |
| 6,088,906 | A | 7/2000 | Hsu et al. |
| 6,177,748 | B1 | 1/2001 | Katcher et al. |
| 6,710,498 | B1 | 3/2004 | Lee et al. |
| 6,900,573 | B2 | 5/2005 | Edwards et al. |
| 6,998,752 | B2 | 2/2006 | Yashuhara et al. |
| 7,019,428 | B2 | 3/2006 | Sato |
| 7,336,013 | B2 | 2/2008 | Pizzichil |
| 7,495,364 | B2 | 2/2009 | Bailey |
| 8,344,576 | B2 | 1/2013 | Hippen et al. |
| 2003/0127938 | A1 | 7/2003 | Shen et al. |
| 2003/0178900 | A1 | 9/2003 | Kumagai |
| 2004/0100160 | A1 | 5/2004 | Potocnik |
| 2004/0201301 | A1 | 10/2004 | Regan et al. |
| 2005/0023924 | A1 | 2/2005 | Tornquist et al. |
| 2005/0040726 | A1 | 2/2005 | Sato |
| 2005/0040727 | A1 | 2/2005 | Edwards et al. |
| 2006/0273683 | A1 | 12/2006 | Caprio et al. |
| 2009/0179516 | A1 | 7/2009 | Baily |
| 2010/0308685 | A1 | 12/2010 | Hippen et al. |

FOREIGN PATENT DOCUMENTS

| | | | |
|---|---|---|---|
| WO | 2009047384 | A1 | 4/2009 |
| WO | 2010141572 | A1 | 12/2010 |

OTHER PUBLICATIONS

Oct. 8, 2015 First Examination Report of counterpart United Kingdom Patent Application No. GB1120135.7, issued in English by the Intellectual Property Office of the United Kingdom.

May 18, 2016 Second Office Action and Search Report of counterpart Chinese Patent Application No. 201210184241.7, issued by the State Intellectual Property Office of P.R. China, and attached English Translation thereof.

Mar. 3, 2016 Second Examination Report of counterpart United Kingdom Patent Application No. GB 1120135.7, issued in English by the Intellectual Property Office of the United Kingdom.

Sep. 6, 2016 Third Office Action and Search Report of counterpart Chinese Patent Application No. 201210184241.7, issued in Chinese by the State Intellectual Property Office of People's Republic of China.

Dec. 15, 2016 Fourth Office Action of counterpart Chinese Patent Application No. 201210184241.7, issued in Chinese by the State Intellectual Property Office of People's Republic of China.

Jul. 3, 2013 First Office Action of counterpart Chinese Patent Application No. 201080024464.6, issued in Chinese by the State Intellectual Property Office of People's Republic of China.

Feb. 13, 2014 Second Office Action of counterpart Chinese Patent Application No. 201080024464.6, issued in Chinese by the State Intellectual Property Office of People's Republic of China.

Jun. 10, 2014 First Search Report of counterpart Chinese Patent Application No. 201080024464.6, issued in Chinese by the State Intellectual Property Office of People's Republic of China.

March 22, 2017 Rejection Decision of counterpart Chinese Patent Application No. 201210184241.7, issued in Chinese by the State Intellectual Property Office of People's Republic of China.

Jun. 14, 2017 Examination Report of counterpart UK Patent Application No. 1113970.6, issued by the UK Intellectual Property Office.

ELECTRIC MOTOR ROTOR

CROSS-REFERENCE TO RELATED APPLICATIONS

This application is a continuation of U.S. application Ser. No. 13/153,642, filed 6 Jun. 2011, which is a continuation-in-part of U.S. application Ser. No. 12/791,832, filed 1 Jun. 2010, now U.S. Pat. No. 8,344,576, which claims priority to and the benefit of U.S. provisional application Ser. No. 61/217,674 filed 3 Jun. 2009, the disclosures of which are all incorporated herein by reference.

FIELD

This disclosure relates to the field of electric motors and more specifically to rotors of such motors that contain magnetic field reactive elements suitable for high speed operations.

SUMMARY

Particularly challenging aspects in the design of the rotor of an electric motor that has the capability to be driven at speeds exceeding 100,000 rpm concern the prevention of centrifugal forces from expanding the rotor elements such that they become separated from the shaft to which they are attached. In the case of an induction motor, it is important to prevent expansion of the rotor elements to avoid coming into contact with the stator element.

Electric motor rotors disclosed herein are suitable for use in turbochargers and other environments where motors may be required to operate at significantly high speeds exceeding 100,000 rpm. Typically, electrically controlled turbochargers employ a high speed electrical motor to rotate the turbo shaft which exists between the oppositely mounted compressor and turbine. The embodiments disclosed herein provide a center supporting disk on the rotor to provide additional support to the rotor bars to minimize their outward deformation during high speed operation.

DETAILED DESCRIPTION

Figure 1A:
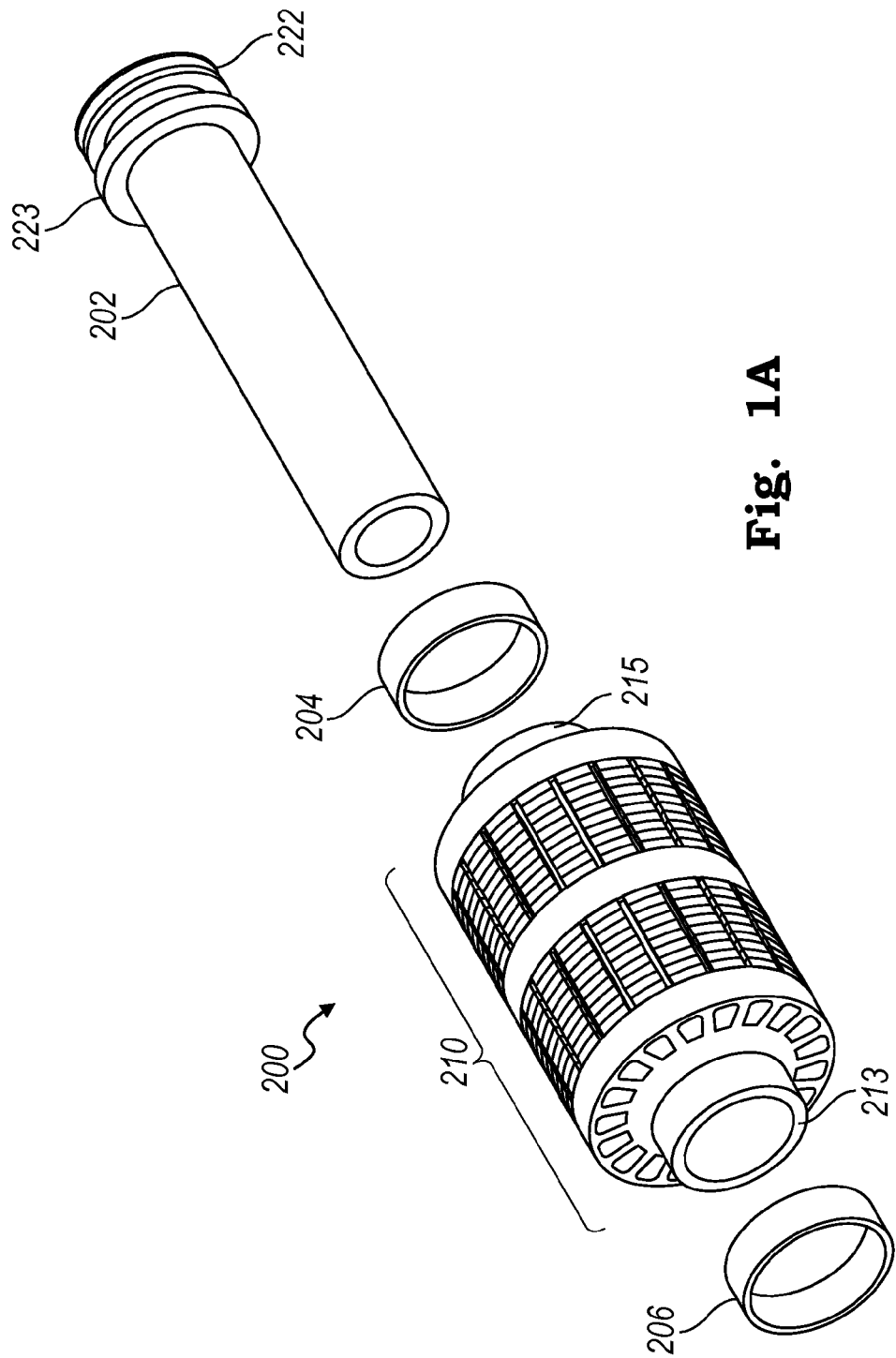
FIGS. 1A and 1B are exploded views of components included in a rotor of an electric induction motor.
Figure 2:
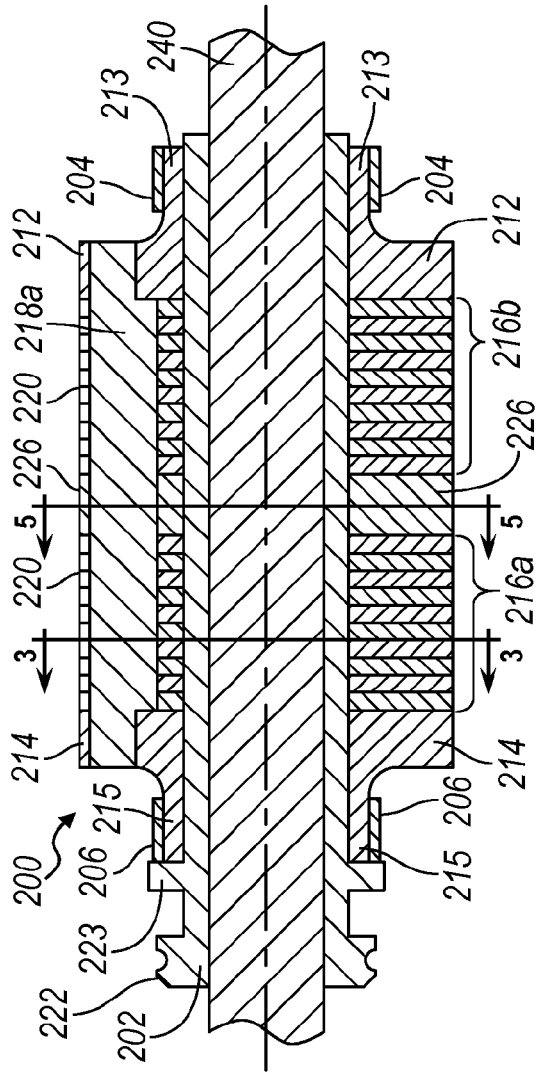
FIG. 2 is a cross-sectional plan view along the axis of an induction motor rotor assembly comprising the components shown in FIGS. 1A and 1B.

In FIG. 1A the major components of a rotor 200 of an electric induction motor include an assembled rotor element 210, containment rings 204 and 206 and stiffener sleeve component 202 for mounting on a rotor shaft 240 (FIG. 2).

Figure 1B:
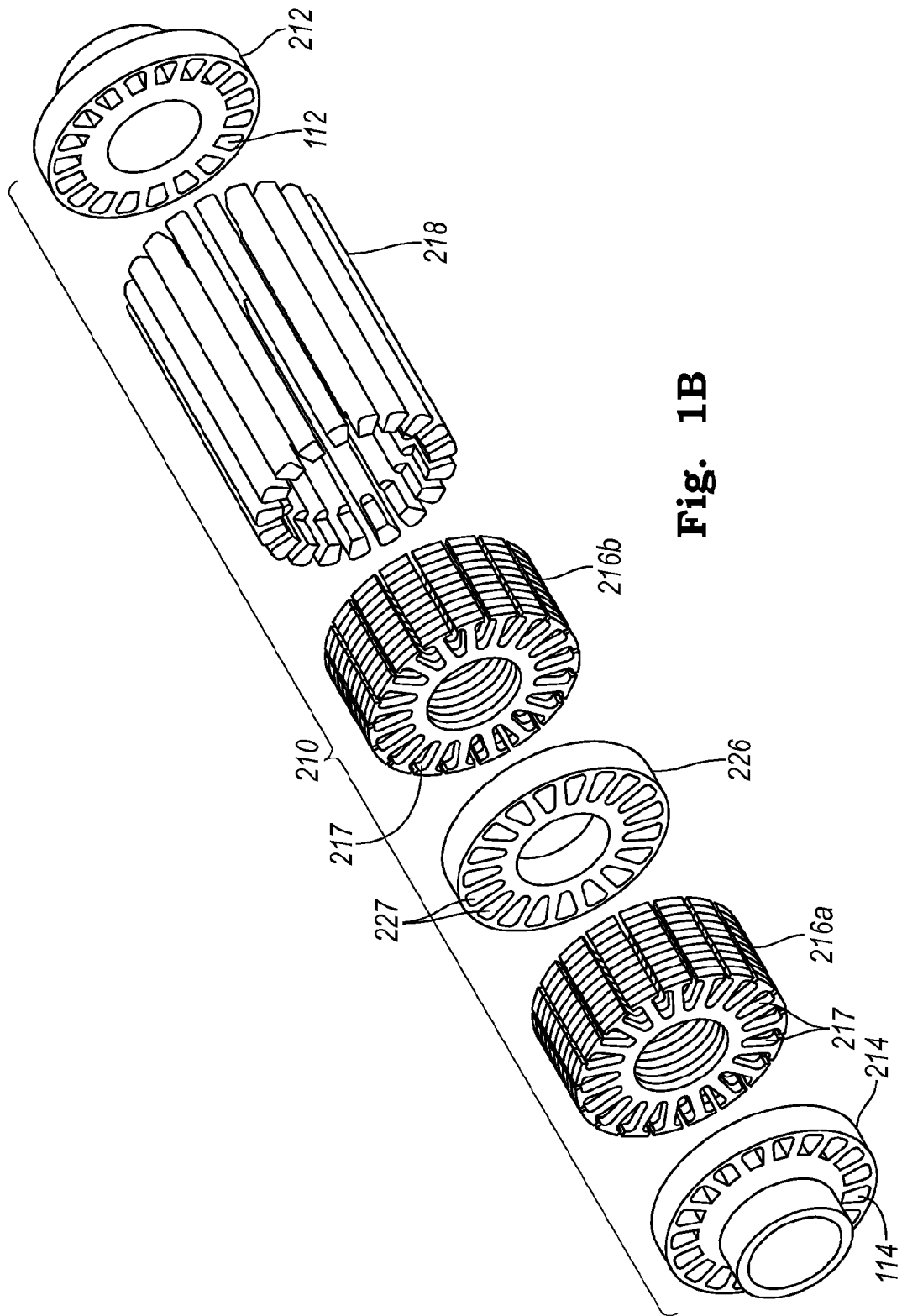

In FIGS. 1B and 2, rotor element 210 is shown to include two end rings 212 and 214 (sometimes referred to as "balance" rings) having a plurality of apertures 112 and 114, a plurality of (19) rotor bars 218, and a plurality of (65) steel laminations in sets 216a and 216b arranged in axially aligned stacks. A central supporting disk (also referred to herein as an anti-expansion disk) 226 is centrally located between laminations sets 216a and 216b. Rotor bars 218 slide through apertures in steel lamination sets 216a and 216b, through apertures in supporting disk 226, and through apertures in end rings 212 and 214. The purpose of central supporting disk 226 is to minimize the effects of centrifugal forces from distorting the rotor bars 218 during high speed operations.

Steel laminations 216 can be formed of high-strength electrical steel, such as Hyperco 50™, heat treated to provide maximum strength, and oxide coated to prevent electrical current losses between laminations. Rotor bars 218 can be made from a high strength-to-density ratio (specific modulus) and high electrical conductivity alloy, such as 2219 Al.

During assembly, rotor lamination sets 216a and 216b are coaxially arranged in stacks on either side of lamination supporting disk 226. Rotor bars 218 are inserted into (or molded in) slots 217 (217a-217s) and 227 (227a-227s). End rings 212 and 214 are installed on each end and the ends of rotor bars are received into apertures 112 and 114 of the balance rings 212 and 214, respectively. The assembly is then clamped together axially to compress the laminations together. Rotor bars 218 are then welded to end rings 212 and 214. Such welding may employ an electron beam process or any other process that provides effective high strength welding for such metals. Heat sinks are attached to the rotor during this process to minimize the distortional effects of welding. After welding, rotor 210 is machined on all outside surfaces and the ID to improve concentricity of the inside diameter, ID, and outside diameter, OD, as well as balance.

Following machining, the rotor assembly 210 is slid onto the stiffener sleeve 202. The assembly is then balanced and the stiffener sleeve 202 is press fitted onto shaft 240. While there may be some tolerance between the stiffener sleeve 202 and the ID of the laminations to prevent pre-stress in the laminations, the end rings 212 and 214 and central support disk 226 are press fitted onto the sleeve 202 to secure the rotor assembly 210 to shaft 240 under extremes in operational circumstances.

Rotor 210 can alternatively be injection molded in a high-pressure injection molding process where the rotor laminations 216a and 216b are placed in a mold and molten aluminum is injected into slots 217 and 227 to form the rotor bars 218. In the same process, end rings 212 and 214 and central support disk 226 are also formed.

End rings 212 and 214 are preferably fabricated from the same or similar alloy used to fabricate the rotor bars 218 and serve to minimize expansion of the rotor ends during high speed operations. Furthermore, central support disk 226 may be fabricated from the same or similar alloy as used for end rings 212 and 214 and rotor bars 218.

To further mitigate the effects of centrifugal forces generated at high rotational speeds, the end rings 212 and 214 can include axial extensions 213 and 215. Extensions 213 and 215 are smaller in diameter than the main body of the end rings 212 and 214. By making end-ring extensions 213 and 215 smaller in diameter, the extensions experience much less centrifugal force and therefore retain their press fit onto the stiffener 202 and shaft 240 throughout the broad range of operating speed.

In some embodiments, containment rings 204 and 206, formed of high strength steel, are clamped around the end rings 212 and 214 to further ensure the integrity of the press fit between end rings, stiffener sleeve 202 and shaft 240. In FIGS. 1A and 2, containment rings 204 and 206 are located on end ring extensions 213 and 215.

When employed in an electrically-controlled turbocharger design, motor rotors are typically elongated. There is a concern that longer rotor bars, such as 218 in FIGS. 1B and 2 may be subjected to large centrifugal forces at high rotational speeds that act on the central portions of the rotor bars forcing them outwardly in a radial direction sufficient to affect the motor-to-stator air gap. If distortion of the rotor bars is too great, the rotor contacts the stator. In some embodiments, the individual laminations are provided with an oxide coating to prevent shorting between adjacent laminations and to prevent shorting between the surfaces of the slots formed in the laminations to the rotor bars. If large outward forces act upon the laminations the oxide coating on the surfaces of slots 217 could wear and eventually lead to shorting between laminations and the rotor bars. End rings 212 and 214 as well as central support disk 226 restrain expansion of the rotor rods 218. In the embodiment shown in FIG. 2, central support disk 226 is shown between lamination stacks 216a and 216b. In an embodiment in which it is advantageous to have a particularly long rotor, at least one additional support disk is provided between additional sets of lamination stacks. Thus, in one alternative embodiment, there are three sets of lamination stacks with a first support disk provided between first and second sets of the lamination stacks and a second support disk provided between second and third set of the lamination stacks.

In FIG. 2, a first protuberance 222 and a second axial protuberance 223 extend outwardly in a radial direction from stiffener sleeve 202. The space between the two protuberances 222 and 223 is of a smaller diameter. This smaller diameter portion provides a shoulder for a tool to grab onto the stiffener sleeve 202 for disassembly.

Figure 3:
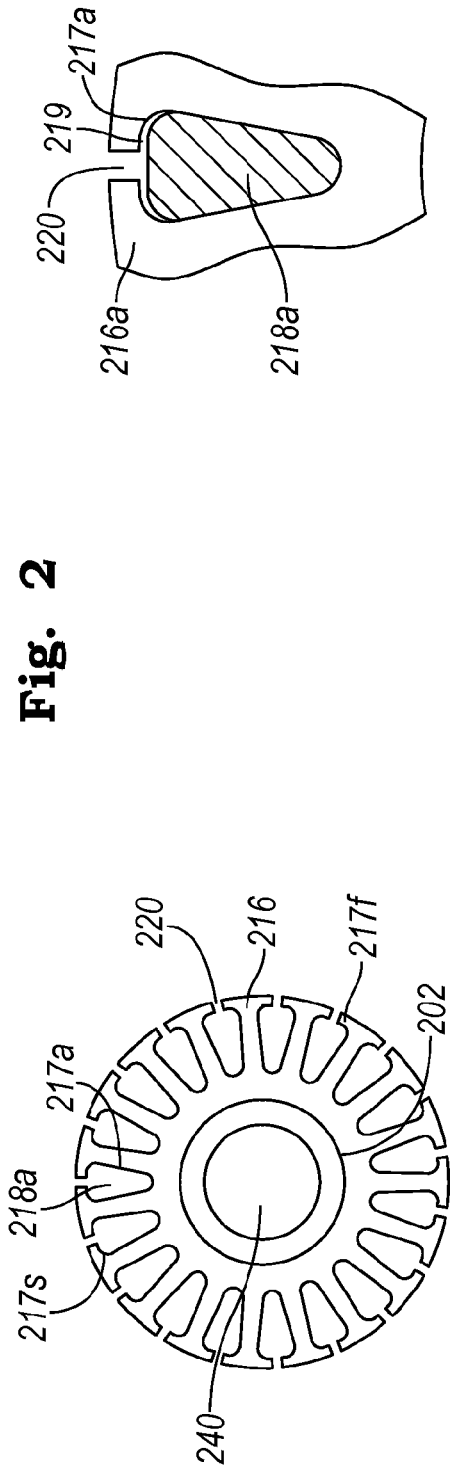
FIG. 3 is a plan view of a lamination taken along section line III-III in FIG. 2.

FIG. 3, a cross-sectional view of lamination 216a taken along section line III-III in FIG. 2, shows the distribution of the 19 slots 217a-217s. In this view, the stiffener 202 is shown surrounding the rotor shaft 240. Rotor bars 218a-218s are inserted into the corresponding slots 217a-217s.

Figure 4:
FIG. 4 is an enlarged view of a lamination aperture from FIG. 3, containing a rotor bar.
Figure 6:
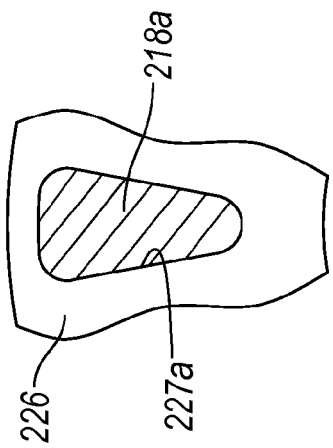
FIG. 6 is an enlarged view of a portion of FIG. 5 of a center support ring aperture containing a rotor bar.
Figure 5:
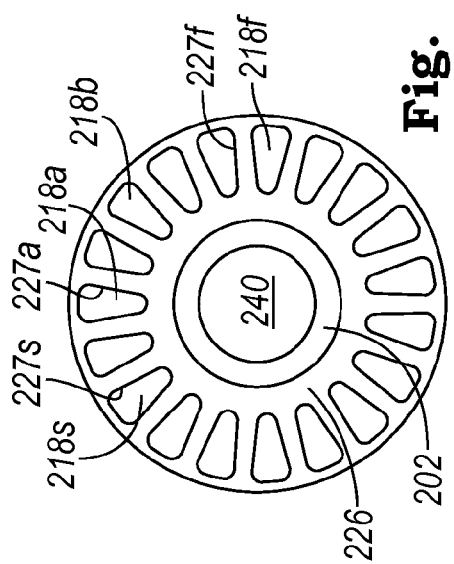
FIG. 5 is a plan view of a center support ring taken along section line V-V in FIG. 2.

As can be seen in FIG. 4, the enlarged view of slot 217a in lamination 216a is radially oriented. Rotor bar 218a is inserted into the slot 217a. When stationary, as shown in FIG. 4, slot 217a is slightly larger than rotor bar 218a. An air gap 219 exists between slot 217a and rotor bar 218a. At high rotational speeds, rotor bar 218a expands more than lamination set 216a and thus more than slot 217a. Therefore, at high speed, air gap 219 is taken up by the expanded rotor bar 218a. An air gap opening 220 provides a separation so that poles are formed in the adjacent teeth (the radial portions of the laminations between the adjacent slots). In FIG. 5, a cross-sectional view through central support disk 226 taken along section line V-V in FIG. 2 shows the distribution of the 19 slots 227a-227s. Central support disk 226 surrounds stiffener 202 which is press fitted to the rotor shaft 240. Rotor bars 218a-218s are inserted into the corresponding slots 217a-217s. There is no air gap between slot 227a of central support disk 226 and rotor bar 218a as can be seen in detail in the embodiment shown in FIG. 6 because rotor bar 218a and central support disk 226 are made of materials with similar expansion characteristics. Further, by avoiding an air space, support disk restrains rotor bar 218a from outward movement.

Figure 7:
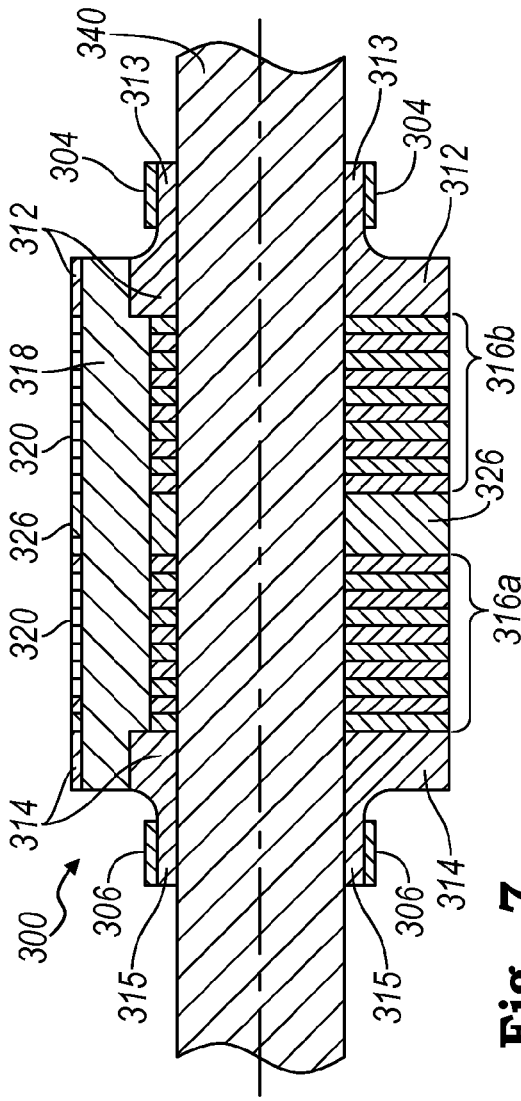
FIG. 7 is a cross-sectional plan view along the axis of an induction motor rotor assembly mounted directly on a shaft.

FIG. 7 illustrates a rotor assembly 300 that is mounted directly on rotor shaft 340 that can be used in environments where a stiffening component is not included. Rotor assembly 300 includes two end rings 312 and 314, a plurality of rotor bars 318 (only one of which is shown in this cross section) and steel lamination sets 316a and 316b that are axially aligned stacks. A central support disk 326 is centrally located and has slots through which rotor bars 318 are inserted. Central disk 326 provides stiffening to minimize the distortion of the rotor bars at high rotational speeds. Extensions 313 and 315, extending axially from end rings 312 and 314 are smaller in diameter than the main body of the end rings 312 and 314 to reduce the mass surrounding the press fit to shaft 340.

Figure 8:
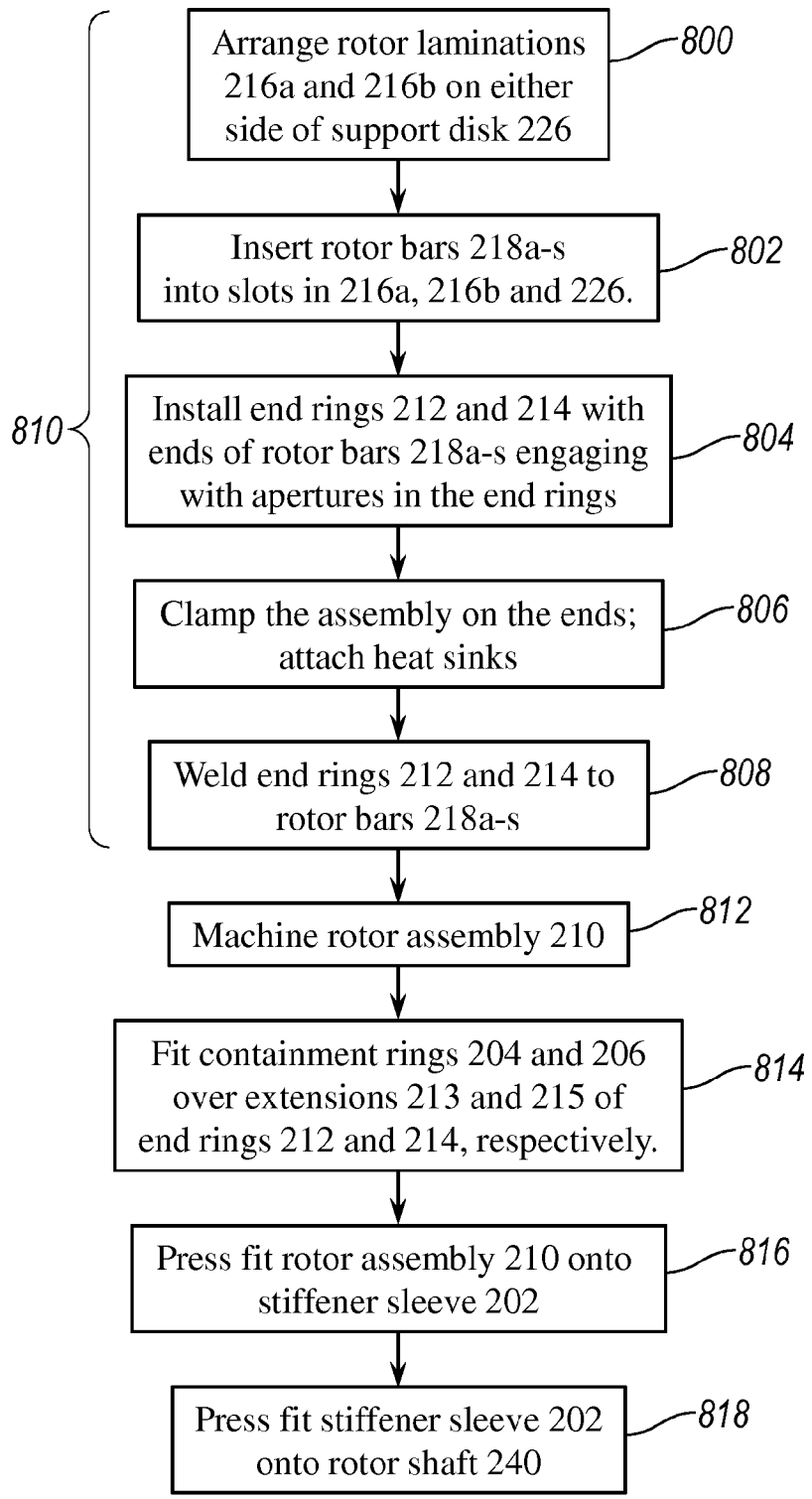
FIGS. 8 and 9 illustrate embodiments by which a rotor may be assembled.

The procedure to assemble the rotor assembly onto the shaft, according to one embodiment, is illustrated in FIG. 8. In 800, laminations stacks 216a and 216b are arranged on either side of supporting disk 226. The slots are aligned so that in 802 the rotor bars 218a-s can be inserted in the slots through 216a, 216b, and 226. In 804, end rings 212 and 214 are slid onto rotor bars 218a-s with apertures in the end rings engaging with the rotor bars. In 806, the assembly is clamped together to compress the laminations axially and a heat sink is attached prior to welding the end rings 212 and 214 to the rotor bars 218. The welding process may be an electron beam process. In blocks 800 through 808, rotor assembly 210 is formed, designated as 810 in FIG. 8. After rotor assembly 210 is welded, it is machined to improve its concentricity and balance. In embodiments that include containment rings 204 and 206, they are fit onto extensions 213 and 215, respectively, in 814. Rotor assembly 210 is press fit onto stiffener sleeve 202 in block 816. In one embodiment, only the end rings 212 and 214 and central support disk 226 are press fit on the stiffener sleeve. Lamination sets 216a and 216b are slightly oversize, with respect to the inner diameter, to avoid cracking the laminations during assembly. In block 818, stiffener sleeve 202 is press fit onto rotor shaft 240.

Figure 9:
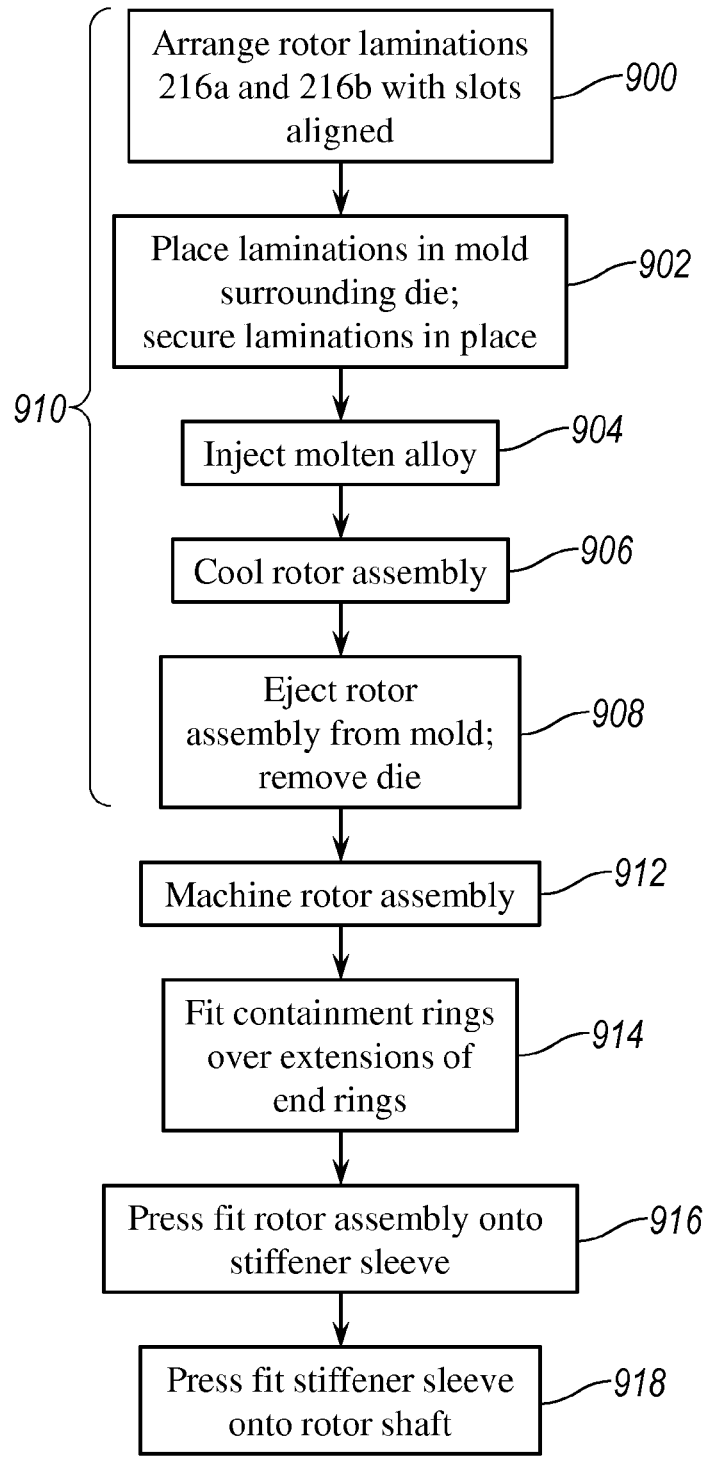

In one embodiment, the end rings, the central support disk, and the rotor bars are made of the same material, e.g., an aluminum alloy, and these are produced by injection molding. In such embodiment, the manufacture begins with stacking laminations sets 216a and 216b, as illustrated in FIG. 9, starting at 900. Lamination sets 216a and 216b are placed in an injection mold and secured in place during molding, at 902. Also in 902, a die is centrally located within the laminations so that aluminum is not injected into the space reserved for rotor shaft 240 and stiffener sleeve 202. The molten aluminum alloy is injected into the mold, in 904. The end rings, central support disk, and rotor bars are one integral part, which, of course, cannot be disassembled from the laminations. The combination of parts forms the rotor assembly. The rotor assembly is cooled, 906, before being ejected from the mold, 908. In 908, the die is removed from the rotor assembly. Group 910 designates the processes to form the rotor assembly. In 912, the rotor assembly is machined to remove artifacts from the mold process. Additionally, the machining may improve the dimensional accuracy and hence balance and fit of the rotor assembly. In embodiments that include containment rings 204 and 206, they are fit onto extensions of the end rings, respectively, in 914. Rotor assembly is press fit onto stiffener sleeve 202 in block 916. In one embodiment, only the end rings and central support disk 226 are press fit on the stiffener sleeve.

Lamination sets 216a and 216b may be slightly oversize, with respect to the inner diameter, to avoid cracking the laminations during assembly. In block 818, stiffener sleeve 202 is press fit onto rotor shaft 240. In embodiments in which a stiffener sleeve 202 is not used, the rotor assembly is press fit directly onto rotor shaft 240.

The embodiments shown here are exemplary in nature and shall not be considered to be a restriction on the scope of the claims set forth herein.

We claim:

1. A rotor assembly for an electric motor, comprising:
a first plurality of laminations arranged axially with each defining therethrough a first plurality of slots open to an outer periphery thereof;
a second plurality of laminations arranged axially with each defining therethrough a second plurality of slots open to an outer periphery thereof;
a support disk positioned between the first and second plurality of laminations and defining therethrough a plurality of closed slots aligned with the first and second plurality of slots of each of the first and second plurality of laminations respectively, the support disk having an axial thickness greater than axial thicknesses of each lamination in each of the first and second plurality of laminations;
a plurality of rotor bars extending through the aligned plurality of slots of each of the first and second plurality of laminations and the support disk;
a first end ring defining a plurality of apertures engaging first ends of the plurality of rotor bars; and
a second end ring defining a plurality of apertures engaging second ends of the plurality of rotor bars opposite the first ends thereof;
wherein, with the plurality of rotor bars extending through the plurality of closed slots defined therethrough, the support disk minimizes radial expansion of the plurality of rotor bars between the first and second end rings during rotation of the rotor assembly.

2. The rotor assembly of claim 1 wherein the plurality of rotor bars are inserted through the aligned plurality of slots of each of the first and second plurality of laminations and the support disk;
and wherein the first and second ends of the plurality of rotor bars are welded to the apertures of the first and second end rings respectively.

3. The rotor assembly of claim 1 wherein each of the plurality of rotor bars is formed in an injection molding process.

4. The rotor assembly of claim 3 wherein the support disk and the first and second end rings are also formed in the injection molding process.

5. The rotor assembly of claim 1 further comprising a stiffener sleeve extending centrally through the first and second plurality of laminations, the support disk and the first and second end rings;
wherein the support disk and the first and second end rings are press fit onto the stiffener sleeve.

6. The rotor assembly of claim 5 further comprising a rotor shaft extending through the stiffener sleeve;
wherein the stiffener sleeve is press fit onto the rotor shaft.

7. The rotor assembly of claim 5 wherein the first end ring includes a first extension extending axially away from the first and second plurality of laminations and the second end ring includes a second extension extending axially away from the first and second plurality of laminations;
and wherein the stiffener sleeve extends through the first and second extensions;
and wherein the rotor assembly further comprises:
a first containment ring clamped around the first extension to secure the first extension to the stiffener sleeve; and
a second containment ring clamped around the second extension to secure the second extension to the stiffener sleeve.

8. The rotor assembly of claim 1 wherein the first and second plurality of slots extend about and adjacent to the outer peripheries of each of the first and second plurality of laminations respectively, the plurality of closed slots extend about and adjacent to an outer periphery of the support disk and the apertures extend about and adjacent to outer peripheries of each of the first and second end rings.

9. A rotor assembly for an electric motor, comprising:
a first plurality of laminations arranged axially with each defining therethrough a first plurality of slots;
a second plurality of laminations arranged axially with each defining therethrough a second plurality of slots;
a support disk positioned between the first and second plurality of laminations and defining therethrough a plurality of slots aligned with the first and second plurality of slots defined through each of the first and second plurality of laminations respectively;
a plurality of rotor bars extending through the aligned plurality of slots defined through each of the first and second plurality of laminations and the support disk;
a first end ring defining a plurality of apertures engaging first ends of the plurality of rotor bars;
a second end ring defining a plurality of apertures engaging second ends of the plurality of rotor bars opposite the first ends thereof; and
a stiffener sleeve extending through the first and second plurality of laminations, the support disk and the first and second end rings;
wherein the support disk and the first and second end rings are press fit onto the stiffener sleeve.

10. The rotor assembly of claim 9 wherein the plurality of rotor bars are inserted through the aligned plurality of slots of each of the first and second plurality of laminations and the support disk;
and wherein the first and second ends of the plurality of rotor bars are welded to the apertures of the first and second end rings respectively.

11. The rotor assembly of claim 9 wherein each of the plurality of rotor bars is formed in an injection molding process.

12. The rotor assembly of claim 11 wherein the support disk and the first and second end rings are also formed in the injection molding process.

13. The rotor assembly of claim 9 further comprising a rotor shaft extending through the stiffener sleeve;
wherein the stiffener sleeve is press fit onto the rotor shaft.

14. The rotor assembly of claim 13 wherein the first end ring includes a first extension extending axially away from the first and second plurality of laminations and the second end ring includes a second extension extending axially away from the first and second plurality of laminations;
and wherein the stiffener sleeve extends through the first and second extensions;
and wherein the rotor assembly further comprises:
a first containment ring clamped around the first extension to secure the first extension to the stiffener sleeve; and
a second containment ring clamped around the second extension to secure the second extension to the stiffener sleeve.

15. A rotor assembly for an electric motor, comprising:
a first plurality of laminations arranged axially with each defining therethrough a first plurality of slots;
a second plurality of laminations arranged axially with each defining therethrough a second plurality of slots;
a support disk positioned between the first and second plurality of laminations and defining therethrough a plurality of slots aligned with the first and second plurality of slots defined through each of the first and second plurality of laminations respectively;
a plurality of rotor bars extending through the aligned plurality of slots defined through each of the first and second plurality of laminations and the support disk;
a first end ring defining a plurality of apertures engaging first ends of the plurality of rotor bars, the first end ring including a first extension extending axially away from the first and second plurality of laminations;
a second end ring defining a plurality of apertures engaging second ends of the plurality of rotor bars opposite the first ends thereof, the second end ring including a second extension extending axially away from the first and second plurality of laminations;
a stiffener sleeve extending through the first and second plurality of laminations, the support disk, the first and second end rings and the first and second extensions; and
first and second containment rings clamped around outer peripheral surfaces of the first and second extensions respectively to secure the first and second extensions to the stiffener sleeve.

16. The rotor assembly of claim 15 wherein the plurality of rotor bars are inserted through the aligned plurality of slots of each of the first and second plurality of laminations and the support disk;
and wherein the first and second ends of the plurality of rotor bars are welded to the apertures of the first and second end rings respectively.

17. The rotor assembly of claim 15 wherein each of the plurality of rotor bars is formed in an injection molding process.

18. The rotor assembly of claim 17 wherein the support disk and the first and second end rings are also formed in the injection molding process.

19. The rotor assembly of claim 15 wherein the support disk and the first and second end rings are press fit onto the stiffener sleeve.

20. The rotor assembly of claim 19 further comprising a rotor shaft extending through the stiffener sleeve;
wherein the stiffener sleeve is press fit onto the rotor shaft.

* * * * *